United States Patent
Gilmartin et al.

(10) Patent No.: US 8,640,630 B2
(45) Date of Patent: Feb. 4, 2014

(54) TORSION BAR ASSEMBLY AND METHOD, PARTICULARLY FOR RAIL VEHICLE ANTI-ROLL BAR

(75) Inventors: Duncan Gilmartin, Ilkeston (GB); Paul Butler, Derby (GB)

(73) Assignee: Bombardier Transporation GmbH, Berlin (DE)

( * ) Notice: Subject to any disclaimer, the term of this patent is extended or adjusted under 35 U.S.C. 154(b) by 0 days.

(21) Appl. No.: 13/509,036

(22) PCT Filed: Nov. 9, 2010

(86) PCT No.: PCT/EP2010/006798
§ 371 (c)(1),
(2), (4) Date: Aug. 23, 2012

(87) PCT Pub. No.: WO2011/057751
PCT Pub. Date: May 19, 2011

(65) Prior Publication Data
US 2012/0304888 A1    Dec. 6, 2012

(30) Foreign Application Priority Data

Nov. 16, 2009   (GB) .................................. 0920047.8

(51) Int. Cl.
*B61F 5/00*   (2006.01)
(52) U.S. Cl.
USPC ....................................................... 105/199.2
(58) Field of Classification Search
USPC .............. 105/182.1, 199.2, 6.1, 218.1, 218.2
See application file for complete search history.

(56) References Cited

U.S. PATENT DOCUMENTS

| | | | | |
|---|---|---|---|---|
| 2,545,956 A * | 3/1951 | Julien | ......... | 105/182.1 |
| 2,892,420 A * | 6/1959 | Cooper | ......... | 105/194 |
| 3,210,110 A * | 10/1965 | Chieger | ......... | 293/118 |
| 3,212,460 A * | 10/1965 | Peras | ......... | 105/453 |
| 3,469,537 A * | 9/1969 | Barber | ......... | 105/198.6 |
| 3,905,659 A * | 9/1975 | Renk et al. | ......... | 384/130 |
| 3,939,779 A | 2/1976 | Pringle | | |
| 3,940,189 A * | 2/1976 | Renk et al. | ......... | 384/408 |
| 4,173,933 A * | 11/1979 | Kayserling | ......... | 105/182.1 |
| 4,185,854 A * | 1/1980 | Brando | ......... | 280/677 |
| 4,229,056 A * | 10/1980 | Renk | ......... | 384/380 |
| 4,355,582 A * | 10/1982 | Germer | ......... | 105/164 |
| 4,362,109 A * | 12/1982 | Panagin | ......... | 105/182.1 |
| 4,665,835 A * | 5/1987 | Mohacsi et al. | ......... | 105/199.2 |
| 4,735,149 A * | 4/1988 | Scheffel et al. | ......... | 105/218.1 |
| 5,129,156 A * | 7/1992 | Walker | ......... | 29/898.09 |
| 5,222,442 A | 6/1993 | Tack, Jr. | | |

(Continued)

FOREIGN PATENT DOCUMENTS

DE   35 10 454   10/1985
FR   2 330 554   6/1977

(Continued)

*Primary Examiner* — Zachary Kuhfuss
(74) *Attorney, Agent, or Firm* — Harness, Dickey & Pierce, P.L.C.

(57) ABSTRACT

A heavy duty torsion bar assembly, particularly an anti-roll bar assembly for a rail vehicle, includes a lever which is mounted on the bar by an oil injection taper fit, the cooperating surfaces having a drainage groove and being formed to a tolerance of IT7 or better, wherein the final assembled position is determined by a pre-defined axial displacement of the lever from an initial position defined by manual engagement of the two parts.

7 Claims, 2 Drawing Sheets

(56) References Cited

U.S. PATENT DOCUMENTS

| | | | |
|---|---|---|---|
| 5,311,821 A | 5/1994 | Lang et al. | |
| 7,308,856 B2 * | 12/2007 | Foster et al. | 105/218.1 |
| 8,056,484 B2 | 11/2011 | Brundisch et al. | |
| 2011/0303117 A1 | 12/2011 | Timan et al. | |

FOREIGN PATENT DOCUMENTS

| | | |
|---|---|---|
| GB | 1381699 | 1/1975 |
| WO | WO 95/08465 | 3/1995 |
| WO | WO 2004/091992 | 10/2004 |

* cited by examiner

TORSION BAR ASSEMBLY AND METHOD, PARTICULARLY FOR RAIL VEHICLE ANTI-ROLL BAR

CROSS-REFERENCE TO RELATED APPLICATIONS

This application is a National Stage Entry of International Application No. PCT/EP2010/006798, filed on Nov. 9, 2010, which claims priority to British Patent Application Serial No. 0920047.8, filed on Nov. 16, 2009, both of which are incorporated by reference herein.

BACKGROUND AND SUMMARY

This invention relates to dismantlable torsion bar assemblies, and particularly to anti-roll bar assemblies for use in rail vehicles and other heavy load applications.

A torsion bar, such as an anti-roll bar (hereafter "ARB"), is a bar which is mounted for rotation through a small angular range so as to transmit torque between, usually, a pair of torque transmitting elements (hereafter referred to as "levers") which are typically but not necessarily short arms extending radially outwardly from the respective ends of the bar. Such assemblies are typically subjected to frequently and rapidly reversing loads, which in ARBs for passenger-carrying rail vehicles can give rise to a torque of the order of about 20 kNm, with the bar being typically around 65 mm in diameter.

Since the torsion bar must pass through the structural components of the bogie, it is necessary to assemble at least one of the levers in-situ after mounting the bar in the bogie. The ARB assembly must fit within a limited space envelope, with the axial length of the bar being constrained by the track gauge. Much effort has therefore been expended in devising a means of connecting the lever to the bar which allows the joint to be made and unmade with the ARB in-situ in the bogie and which is capable of reliably transmitting such heavy loads without unacceptably increasing the size and cost of the assembly.

A common solution to this problem comprises a cylindrical splined joint as shown for example in WO 2004/091992 A1. The splines permit the arm to be assembled by push-fitting onto the bar; disadvantageously however, the joint is subject to backlash under reversible loads. Moreover, stress concentrations in the splines require the end regions of the bar to be diametrically enlarged in order to avoid fatigue failure, which is undesirable since it significantly increases the cost of the bar. In order to reduce these problems, conical splined joints have been developed, which however are considerably more expensive to manufacture. Moreover, it is found that the splines wear in service, which requires the ARB assembly to be replaced several times during the life of the bogie.

It is also known to assemble the levers to a heavy duty ARB by means of a shrunk or pressed cylindrical interference fit, which is advantageously free from backlash, relying on the frictional force developed by the pressure and the coefficient of friction between the mating dry steel surfaces to transmit torque between the respective parts. Such ARB assemblies are advantageously compact, low in cost and largely free from stress concentrations. However, the assembly of the joint requires either that the levers are heated to a high temperature, which is hazardous and inappropriate in rail maintenance depots, or the application of a very heavy press force, which it is impractical to react against an ARB in-situ in a bogie.

GB 1 381 699 depicts an ARB assembly for a rail vehicle bogie in which the lever is split to form a splined clamp which engages the end of the ARB. Clamped, splined cylindrical joints of this general type have been used successfully on lighter, underground rail vehicles, and advantageously allow the clamp to be tightened in-situ so as to reduce or remove backlash as the splines wear in service. However, such joints have not been proven for use in heavier applications such as standard overground passenger-carrying rail vehicles, and doubts exist as to their load-carrying capacity.

An alternative approach is to provide a locking collar as a separate component which is engaged between the lever and the ARB. Known joints of this type have been found suitable for in-situ assembly and disassembly, but disadvantageously tend to be complex and bulky.

It is an object of the present invention to provide a dismantlable torsion bar assembly which is more suitable for use in heavy load applications requiring in-situ assembly, and particularly for use as a rail vehicle ARB assembly. It is a further object to provide a corresponding method of assembly. In accordance with the present invention there are provided respectively a dismantlable torsion bar assembly and a method of assembly, as defined in the claims.

BRIEF DESCRIPTION OF THE DRAWINGS

An illustrative embodiment comprising an ARB assembly for a rail vehicle will now be described, purely by way of example and without limitation to the scope of the claims, and with reference to the accompanying drawings, in which:

DETAILED DESCRIPTION

Figure 1:
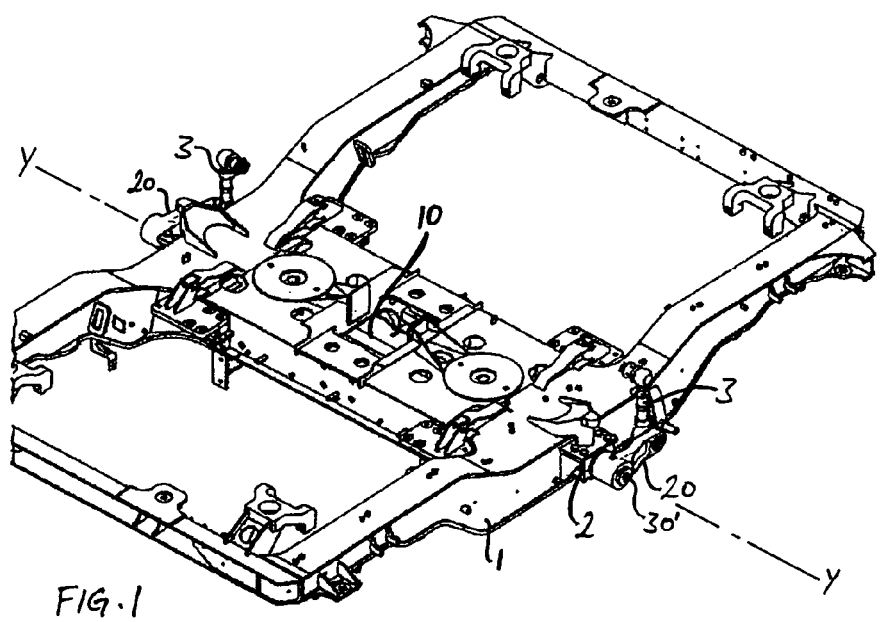
FIG. 1 shows the assembly in-situ in a bogie frame of the vehicle.
Figure 2:
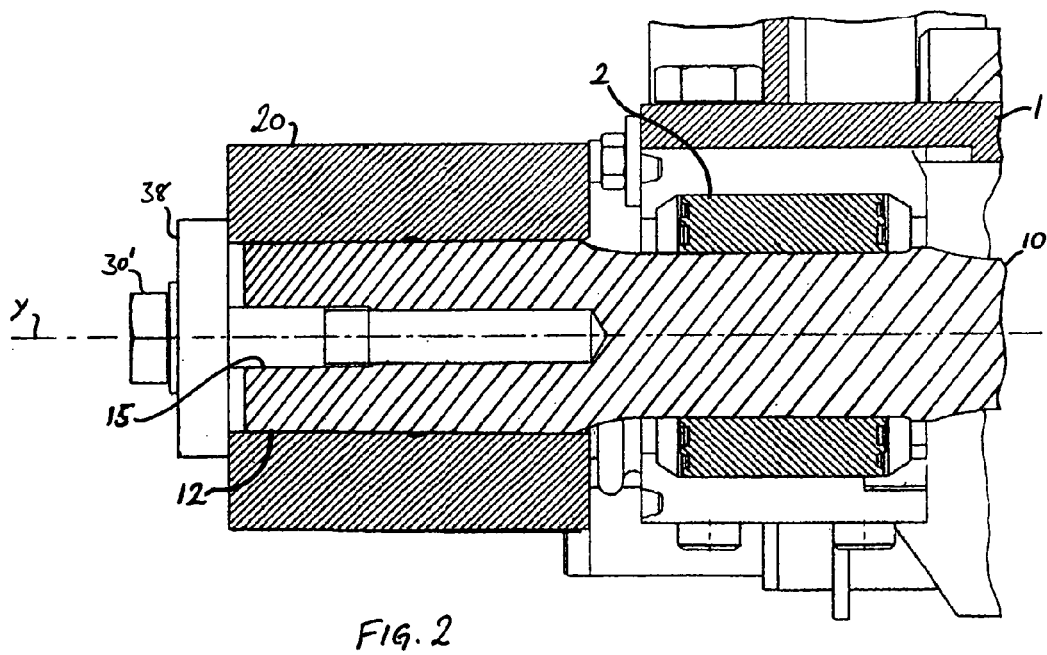
FIG. 2 is a longitudinal section of one end portion of the assembly.

Corresponding reference numerals refer to the same parts in each of the figures. Referring to the FIG. 1, a heavy duty, dismantlable torsion bar assembly comprises a high-tensile steel torsion bar 10 having a diameter of at least about 50 mm, typically from about 50 mm to about 80 mm, and a pair of levers 20 which extend radially outwardly from the end portions 11 of the bar. In use, the torsion bar is first inserted through apertures in the frame 1 of a bogie of the rail vehicle, in which it is supported in bearings 2 of known type so that its end portions 11 extend for a small distance from the sides of the frame. The levers 20 are then mounted on the bar as further described below, and are coupled to the rail vehicle body (not shown) via respective links 3. The bearings permit the bar 10 to rotate about its longitudinal axis Y through a small angular range sufficient to transmit torque between the two levers 20 in response to rolling movements of the body.

Referring to FIGS. 2-5, a smooth, tapered, frusto-conical external surface of rotation 12 is formed about the longitudinal axis of the torsion bar 10 on each of its end portions 11. Each lever 20 is provided with a socket 21 defining a correspondingly tapered internal surface of rotation 22. Since the overall length of the ARB assembly must be contained within the envelope of the track gauge, it is impractical to provide the bar with a threaded boss or similar part which extends outwardly through the socket in the lever to facilitate assembly.

Each of the end portions 11 is therefore also provided with a threaded bore 15 which opens at the axial end surface 14 of the bar and which facilitates the reaction of jack force in tension against the bar as described below.

An internally threaded pressure fluid injection port 23 is formed in the lever and communicates at its inner end with a pressure fluid drainage groove formed in the internal surface of rotation 22 and comprising a first, annular portion 24, which extends circumferentially around the socket, and two shallower, helical portions 13. The helical portions 13 communicate with the groove 24 and extend in opposite directions for preferably at least 65%, more preferably about 75% of the overall axial length L of the frictional interface 12' defined between the cooperating surfaces 12 and 22 in the final (assembled) position as shown in FIGS. 1, 2, 3 and 5.

Figure 4:
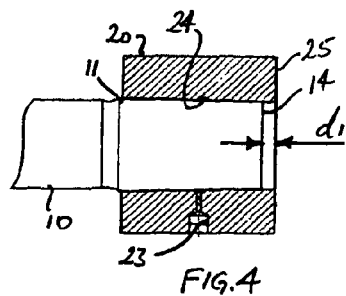
FIG. 4 shows the lever and bar in the initial position during assembly.
Figure 5:
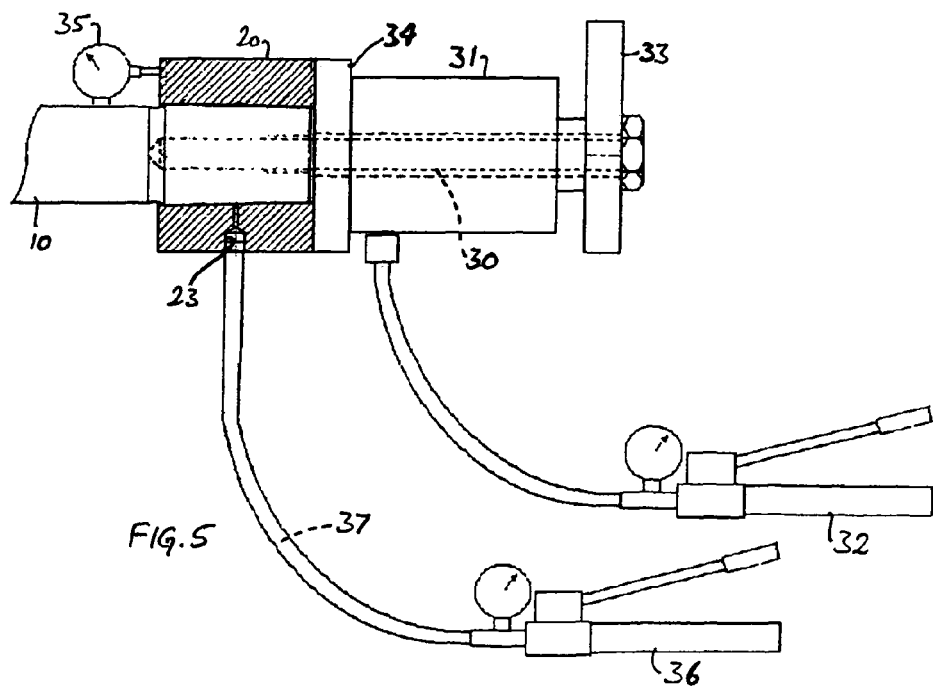
FIG. 5 shows the lever and bar in the final (assembled) position during assembly.

After mounting the torsion bar 10 in the bogie frame 1, the respective contact surfaces 12, 22 are coated lightly with a non-corrosive pressure fluid, suitably an anti-corrosive oil based mounting fluid such as LHMF 300, which has a viscosity of 300 mm$^2$/S at 20° C. and is commercially available from SKF (®) Maintenance Products of Nieuwegein, The Netherlands. The lever is arranged in the correct angular position using alignment tooling and then driven onto the bar as far as possible by manual force using a soft headed mallet so that the end portion 11 of the bar engages in the socket 21 in frictional tapered fit relation, defining an initial position of the lever as shown in FIG. 4. A dial gauge 35 is then arranged in any convenient location to sense the position of the lever 20 relative to the bar 10, and zeroed in the initial position, represented in FIG. 4 by the initial distance d\ between the axial end surface 14 of the bar and the adjacent axial end surface 25 of the lever. A threaded tension element, conveniently a 20 mm diameter bolt 30, is then engaged in the bore 15 and a hollow hydraulic jack 31 is arranged between an outer plate 33 which engages the bearing surface of the bolt head and an inner plate 34 which bears against the lever 20.

Figure 3:
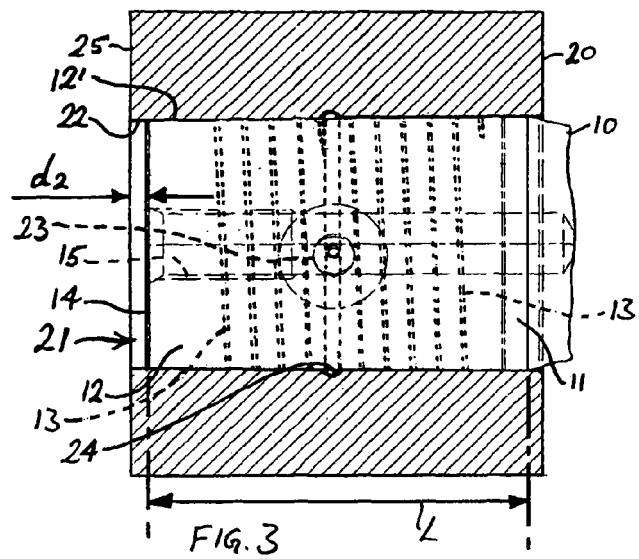
FIG. 3 shows the external surface of rotation of the torsion bar in the assembled position of FIG. 2.

The hydraulic pump 32 of the jack is actuated so as to extend the jack, pressing the lever onto the bar through a first axial distance of travel from the initial position, and conveniently about 2.5 mm, so as to develop sufficient interface pressure between the contact surfaces 12, 22 to create a sufficient edge pressure to provide a seal to inject a pressurised lubricating film between the contact surfaces. A high pressure hand-operated hydraulic pump 36, suitably model TMJE-400 available from SKF (®) (above) is connected to the injection port 23 and operated to force the pressure fluid 37 into the interface between the surfaces 12, 22 at a typical initial pressure of about 70 N/mm$^2$, while maintaining pressure in the jack. The jack and the pump 36 are then operated simultaneously to press the lever further onto the bar, with the pressure of the fluid 37 being progressively increased up to, typically, about 300 N/mm$^2$ until the lever reaches its final assembled position, which is defined by a predefined axial distance of travel (for example, 10 mm) from the initial position, as indicated by the dial gauge and represented in the figures by the difference between d$_1$ (FIG. 4) and the corresponding distance d$_2$ (FIG. 3). The predefined axial distance of travel is determined by calculation and testing to produce the required interference pressure between the two components. In practice, shims of known thickness may conveniently be used instead of a dial gauge to determine the relative axial displacement of the two parts. The pump 36 is then de-pressurised, permitting the pressure fluid to escape from between the respective surfaces of rotation via the drainage groove 13, 24 and the injection port 23 for a period of about 10 minutes, following which the jack 31 is removed and a similar bolt 30' is preferably re-fitted with a retention plate 38 as a safety measure.

The oil injection taper fit assembly method described above is similar to a conventional oil injection taper fit assembly method commonly used for assembling rotating components such as train wheels and bearings on axle shafts. The presence of lubricating pressure fluid between smoothly tapered contact surfaces renders such joints incapable of transmitting the relatively much heavier, rapidly fluctuating and reversing torque generated in torsion bar assemblies and particularly ARB assemblies. However, the applicant has surprisingly found that by forming the cooperating tapered surfaces with very close tolerances so as to provide as nearly as possible uniform interference pressure between them, by providing a pressure fluid drainage groove between the mating surfaces, and by adopting an assembly procedure in which the final position is defined by a pre-determined distance of travel from the initial position of the tapered contact surfaces, sufficient frictional force is developed over a sufficient contact area between the two components to transmit the severe torque (up to about 20-25 kNm for a 75 mm diameter shaft) peculiarly encountered in ARB assemblies without slipping.

Preferably, the drainage groove extends for at least 65%, more preferably about 75% of the axial length of the interface 12', and is arranged as a plurality of spaced-apart portions which are distributed over the interface so as to lie in close proximity to all points on the interface over the axial extent of the groove. This is conveniently achieved by forming the groove helically around the circumference of the socket so as to form a plurality of spaced-apart helical turns as shown. Alternatively for example, a plurality of parallel axial grooves could be connected together and spaced apart around the circumference of the socket, or a plurality of parallel annular grooves could be connected together and spaced apart along the axial length of the socket. The applicant has found that this advantageously permits the pressure fluid to drain off rapidly and completely enough that sufficient frictional force is developed between the two surfaces 12, 22 to allow the jack to be safely removed only 10 minutes after de-pressurisation of the injection pump without any risk of the lever springing off the bar. The joint can then be put into service, although in practice a further delay of not more than 3 hours is prudent to ensure that full frictional force is achieved at the interface.

The respective surfaces of rotation are preferably formed with a taper between 1:30 and 1:80, most preferably about 1:50, which advantageously permits the necessary interference pressure to be generated by a readily available, hand-operated hollow jack within a practical range of relative axial displacement between the two components under high pressure lubrication. This provides a very convenient method of assembly that is suitable for use in rail maintenance depots with the torsion bar in-situ in the bogie. The respective surfaces of rotation are manufactured to a diametrical tolerance of not more than 0.030 mm (ISO tolerance class IT7). In practice, it is found to be extremely difficult to form these surfaces to a diametrical tolerance of less than 0.019 mm (ISO tolerance class IT6).

The applicant has found that by assembling the two parts in accordance with the above-mentioned conventional oil injection taper fit assembly method, by which the assembled position is defined by the relative position of the two parts (determined for example by the alignment of, or predefined separation between, two corresponding reference surfaces on an axle and respectively a wheel or bearing), an unreliable assembly is obtained in which the lever may slip under heavy torque as a result of the variation in the interference pressure between the respective components of different assemblies within the tolerance range. In accordance with the novel method, the final (assembled) relative position of the lever and bar is therefore determined as described above by reference to an initial position, wherein the initial position is defined by the manual engagement of the two parts to a relative position which depends on the actual diameter, taper angle and axial location achieved in each of the two respective contact surfaces and hence is variable between different assemblies. The preferred taper and tolerance ranges are found to give rise to a variation between different assemblies in the position of the lever on the longitudinal axis Y of the bar, conveniently measured as a variation in the distance $d_1$ in the initial position or $d_2$ in the assembled position, of at least +/−2.0 mm in $d_1$ and (including a further tolerance in the predefined axial distance of travel) at least +/−2.5 mm in $d_2$. In practice, where one surface is formed to IT6 and the other to IT7, a tolerance of +/−4 mm is achieved in the distance $d_2$, resulting in a tolerance of typically +/−8 mm in the entire axial length of the ARB assembly comprising a pair of levers, which is accommodated by the links 3 and other conventional components cooperating with the ARB assembly.

The assembly may be disassembled by first re-installing the jack 31 and pump 36 as described above. The pump is then operated to inject pressure fluid, optionally a more viscous dismounting fluid such as LHDF 900 available from SKF (®) (above), between the mating surfaces, the hoop stress in the lever causing the two components to spring apart, which movement is safely controlled by the jack.

The applicant has also found that, where the bore 15 extends for substantially less than the axial length L (FIG. 3) of the interface 12', separation of the two components is surprisingly difficult to achieve. This is believed to be due to the variation in elasticity between the hollow and solid parts of the end portion 11 of the bar and hence in the interference pressure achieved at the interface 12' between the mating surfaces, which pressure is disproportionately high in the solid portion of the bar beyond the end of the bore as compared with the hollow portion of the bar. The bore 15 (which need not be threaded for its entire length) therefore preferably extends as shown for at least the axial length L of the interface 12' (i.e. it preferably extends entirely through that portion of the bar on which the surface defining the interface is formed), which is believed to achieve as far as possible a uniform interference pressure over the entire interface between the mating surfaces 12, 22 and is advantageously found to permit easy disassembly.

In summary, a preferred heavy duty torsion bar assembly, particularly an anti-roll bar assembly for a rail vehicle, comprises a lever which is mounted on the bar by means of an oil injection taper fit, the cooperating surfaces having a drainage groove and preferably being formed to a tolerance of IT7 or better, wherein the final assembled position is determined by a pre-defined axial displacement of the lever from an initial position defined by manual engagement of the two parts. The novel assembly may be suitable for other applications in which heavy, fluctuating loads must be transferred from a torsion bar to a lever or between a pair of levers arranged at the respective ends of the bar.

In alternative embodiments, the lever need not be a short, straight arm, but could be any element that transfers torque to the bar. Pressure fluid drainage grooves might be provided in both the internal and external surfaces of rotation, and might be arranged to communicate in all positions of the lever between the initial position and the assembled position, so that in addition to draining off the pressure fluid after assembly they also help (as does the groove in the illustrated embodiment) to distribute the pressure fluid during assembly and disassembly. In a less preferred embodiment, the pressure fluid injection port could be provided in the bar rather than the lever. Those skilled in the art will appreciate that many other adaptations may be made within the scope of the claims.

The invention claimed is:

1. A dismantlable torsion bar assembly comprising:
a torsion bar;
at least one lever;
the torsion bar having a tapered external surface of rotation formed at an end portion thereof;
the lever having a socket defining a tapered internal surface of rotation;
the socket being adapted to receive the end portion of the bar in an assembled position in which the respective surfaces of rotation cooperate in frictional tapered fit relation to define an interface therebetween;
the end portion of the bar having a threaded bore opening at an axial end surface thereof;
a pressure fluid injection port adapted to deliver a supply of pressure fluid to the interface in the assembled position; and
at least one of the respective surfaces of rotation having a pressure fluid drainage groove communicating with the injection port in the assembled position.

2. A dismantlable torsion bar assembly according to claim 1, wherein the drainage groove extends for at least 65% of an axial length of the interface in the assembled position and is arranged as a plurality of spaced-apart portions which are distributed over the interface.

3. A dismantlable torsion bar assembly according to claim 1, wherein the threaded bore extends for at least an axial length of the interface.

4. A dismantlable torsion bar assembly according to claim 1, wherein the respective surfaces of rotation have a taper between 1:30 and 1:80, and the respective surfaces of rotation have a diametrical tolerance of not less than 0.019 mm and not more than 0.030 mm, and a tolerance of at least +/−2.5 mm is provided in the assembled position of the lever on a longitudinal axis of the bar.

5. A dismantlable torsion bar assembly according to claim 1, wherein the assembly is arranged as an anti-roll bar assembly in a rail vehicle.

6. A method of assembling a torsion bar assembly, comprising:
a) providing a torsion bar and at least one lever;
b) forming a tapered external surface of rotation at an end portion of the bar;
c) providing the lever with a socket defining a tapered internal surface of rotation;
d) forming a threaded bore opening at an axial end surface of the end portion of the bar;
e) providing a pressure fluid injection port communicating with one of the respective surfaces of rotation;
f) providing at least one of the respective surfaces of rotation with a pressure fluid drainage groove, wherein the groove communicates with the injection port in an assembled position of the assembly;
g) driving the lever onto the bar such that the end portion of the bar engages in the socket in frictional tapered fit relation to define an initial position of the lever with respect to the bar;
h) engaging a tension element in the bore and arranging a jack between the tension element and the lever;
i) extending the jack so as to press the lever onto the bar through a first axial distance of travel;

j) forcing pressure fluid via the injection port between the respective surfaces of rotation;

k) extending the jack so as to press the lever onto the bar through a second axial distance of travel to an assembled position, wherein the assembled position is a predefined axial distance from the initial position;

l) permitting the pressure fluid to escape from between the respective surfaces of rotation via the drainage groove and the injection port; and m) removing the jack.

7. A method according to claim 6, further comprising arranging the torsion bar assembly as an anti-roll bar assembly in a rail vehicle, and inserting the torsion bar through apertures in a bogie of the rail vehicle before the lever is driven onto the bar.

\* \* \* \* \*